US010706461B2

(12) United States Patent
Varma et al.

(10) Patent No.: US 10,706,461 B2
(45) Date of Patent: Jul. 7, 2020

(54) SYSTEM AND METHOD FOR TRAFFIC DECONGESTION

(71) Applicant: GREENLIGHTSTRADING LLC, Wilmington, DE (US)

(72) Inventors: Samir Varma, Cos Cob, CT (US); Daniel Sarfati, Raanana (IL)

(73) Assignee: GREENLIGHTSTRADING LLC, Wilmington, DE (US)

( * ) Notice: Subject to any disclaimer, the term of this patent is extended or adjusted under 35 U.S.C. 154(b) by 18 days.

(21) Appl. No.: 15/531,351

(22) PCT Filed: Nov. 25, 2015

(86) PCT No.: PCT/US2015/062694
§ 371 (c)(1),
(2) Date: May 26, 2017

(87) PCT Pub. No.: WO2016/086139
PCT Pub. Date: Jun. 2, 2016

(65) Prior Publication Data
US 2017/0358025 A1    Dec. 14, 2017

Related U.S. Application Data

(60) Provisional application No. 62/084,885, filed on Nov. 26, 2014.

(51) Int. Cl.
*G06Q 30/00* (2012.01)
*G06Q 30/08* (2012.01)
*G06Q 10/02* (2012.01)
*G06Q 20/14* (2012.01)
*G08G 1/0967* (2006.01)

(52) U.S. Cl.
CPC ........... *G06Q 30/08* (2013.01); *G06Q 10/025* (2013.01); *G06Q 20/145* (2013.01); *G08G 1/096708* (2013.01)

(58) Field of Classification Search
None
See application file for complete search history.

(56) References Cited

U.S. PATENT DOCUMENTS

| 2002/0184042 A1 | 12/2002 | Hommrich et al. |
| 2003/0020634 A1* | 1/2003 | Banerjee ............. G07B 15/063 340/928 |
| 2008/0091341 A1 | 4/2008 | Panabaker et al. |
| 2008/0133425 A1 | 6/2008 | Grush |

(Continued)

OTHER PUBLICATIONS

International Search Report and Written Opinion dated Mar. 29, 2016, 8 pages.

*Primary Examiner* — Mila Airapetian
(74) *Attorney, Agent, or Firm* — Foster Garvey PC (57) ABSTRACT

A system and method for traffic decongestion which allows users to bid for faster passage and faster journeys. The system and method allows autonomous, semi-autonomous or user-driven cars to bid for faster passage for their journeys. Users willing to use slower journeys may be compensated for their contribution in reducing traffic congestion. In addition to reduction of traffic congestion, the system and method can normalize road usage, minimize road wear, give municipalities a new revenue stream, and save users time currently wasted by traffic.

8 Claims, 7 Drawing Sheets

(56) References Cited

U.S. PATENT DOCUMENTS

| | | |
|---|---|---|
| 2009/0177383 A1 | 7/2009 | Tertoolen |
| 2011/0166958 A1* | 7/2011 | Hamilton, II ........ G06Q 10/047 |
| | | 705/26.25 |
| 2012/0023033 A1* | 1/2012 | Tomasz ................. G06Q 10/06 |
| | | 705/345 |

* cited by examiner

SYSTEM AND METHOD FOR TRAFFIC DECONGESTION

PRIORITY CLAIM

This application claims priority to U.S. Provisional Patent Application Ser. No. 62/084,885 filed Nov. 26, 2014, which is hereby incorporated by reference in its entirety as if fully set forth herein.

FIELD OF THE INVENTION

The present invention relates to generally to travel and, more particularly, to a system and method for reducing congestion and improving the travel experience.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

This patent application describes one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms.

Embodiments of the invention may be operational with numerous general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, smart watches or other wearable computing devices, distributed computing environments that include any of the above systems or devices, and the like.

Embodiments of the invention may be described in the general context of computer-executable instructions, such as program modules, being executed by a computer and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

In accordance with preferred embodiment of the present invention, a system and method allows users to bid for faster passage, faster journeys, and faster traffic lights. The system and method of the present invention allow autonomous, semi-autonomous or user-driven cars, with an appropriate application installed, to bid for faster passage for their journeys. Additionally, users willing to use slower journeys can be compensated for their contribution in reducing traffic congestion. In addition to reduction of traffic congestion, this invention can even out road usage, minimize road wear, give municipalities a new revenue stream, and save users time currently wasted by traffic.

The system and method rationalizes traffic rights according to an economic principle. Rights to travel are allocated via bidding, instead of the current system where traffic priority is decided a priori by traffic technicians with rare changes due to real traffic dynamics. Or, in other words, the system provides traffic rights to whoever is willing to pay the most for them.

Navigation systems, applications, and communication devices within vehicles are interconnected with traffic signals, road sensors and other road condition monitors, to allow them all to communicate with each other and to a Central Computing Unit (also referred to herein as "central computer") to create real-time bidding for the fastest (at a cost) and/or slower journey (at a lower or even negative cost=receive payment).

Navigation systems provide users with information about current traffic conditions and suggests optimal routes to achieve either minimal transit time or minimal cost (by way of example, by avoiding tolls). In accordance with the present invention, users are not passive receivers of traffic information anymore and can influence and change the traffic patterns by bidding to achieve minimal transit time or cost or any desired combination thereof. The system and method may act directly and in real time on active traffic management tools such as traffic lights, lane restrictions, toll booths, ferry timetables, railway crossings, etc. as well as consider, in real time, existing road conditions, lane openings and closures, road work and known traffic. Based on the inputs by bidders and/or superplayers the proposed system acts on the active traffic management tools to change estimated transit time(s) to accommodate the will of the highest bidder(s).

In addition, the system and method of the present invention offers monetary compensation/credit to lower bidders or to takers willing to reroute through less desired routes thus freeing more desired routes to the benefit of the higher bidders. Superplayers, such as emergency vehicles and/or law enforcement in emergency travel, can outbid (with or without payment, as desired by the relevant authorities) any bidder and can be granted fastest driving times to their destination. Traffic data generated by the system is used to optimize the traffic conditions, to maximize the revenues from bids, to optimize the system algorithms and to satisfy the interests of third parties. Self-driving cars connect to the bidding system through published APIs. Car users chose bidding preferences through an ad-hoc App, management tools, through settings and contract preferences. The bidding system automatically supplies self-driving cars with routes to best-fit said settings and preferences.

Users of the system can influence and change the traffic patterns to their advantage: by bidding on routes users can decrease their transit time. Users who are less sensitive to short transit times receive compensation or credit for choosing less desired routes. Superplayers, such as ambulances, fire trucks, police cars, military/government personnel (Presidential Motorcades, for example), funeral processions, and the like, can always be given the fastest route, especially while in emergency travel mode.

The provider of the service produces revenues from the bids. Municipalities and road owners/administrators receive part of the revenues from the bids. Municipalities and road owners/administrators disperse traffic over multiple routes thus increasing the rate of utilization of all existing roads while at the same time reducing the utilization for more desired routes. The end result is to reduce the need to build and expand roads thus postponing investment in expansion, new roads and maintenance.

Advertisers or other third-party players such as establishments with drive-thru services also benefit from the system and method of the present invention: for example, those that want to influence traffic patterns to increase visits at their location can do so by bidding, and/or by providing coupons and/or vouchers. Advertisers or other third party players such as establishments with drive-thru services can manage the number of active personnel and their supply chain by knowing the number of vehicles expected to drive by their location. Rational road planning data will exist for the first time which shows actual user preferences. Rational city, town, and commute planning data will exist for the first time. Rational building data will exist for the first time for all sorts of purposes and for all kinds of users: where to build, how to zone, what to zone for, how to route traffic for those buildings and/or building activity, how to reroute traffic temporarily and permanently, etc. Roads where light traffic is needed for any municipal purpose need not be closed: their price can simply be raised. As a result, the traffic can be as light as needed but no closing is necessary and so inconvenience is minimized. Overall taxation rates could be lower due to the revenue collected from the routes and the reduced maintenance cost. New routes could be priced higher to pay for their building.

Figure 1:
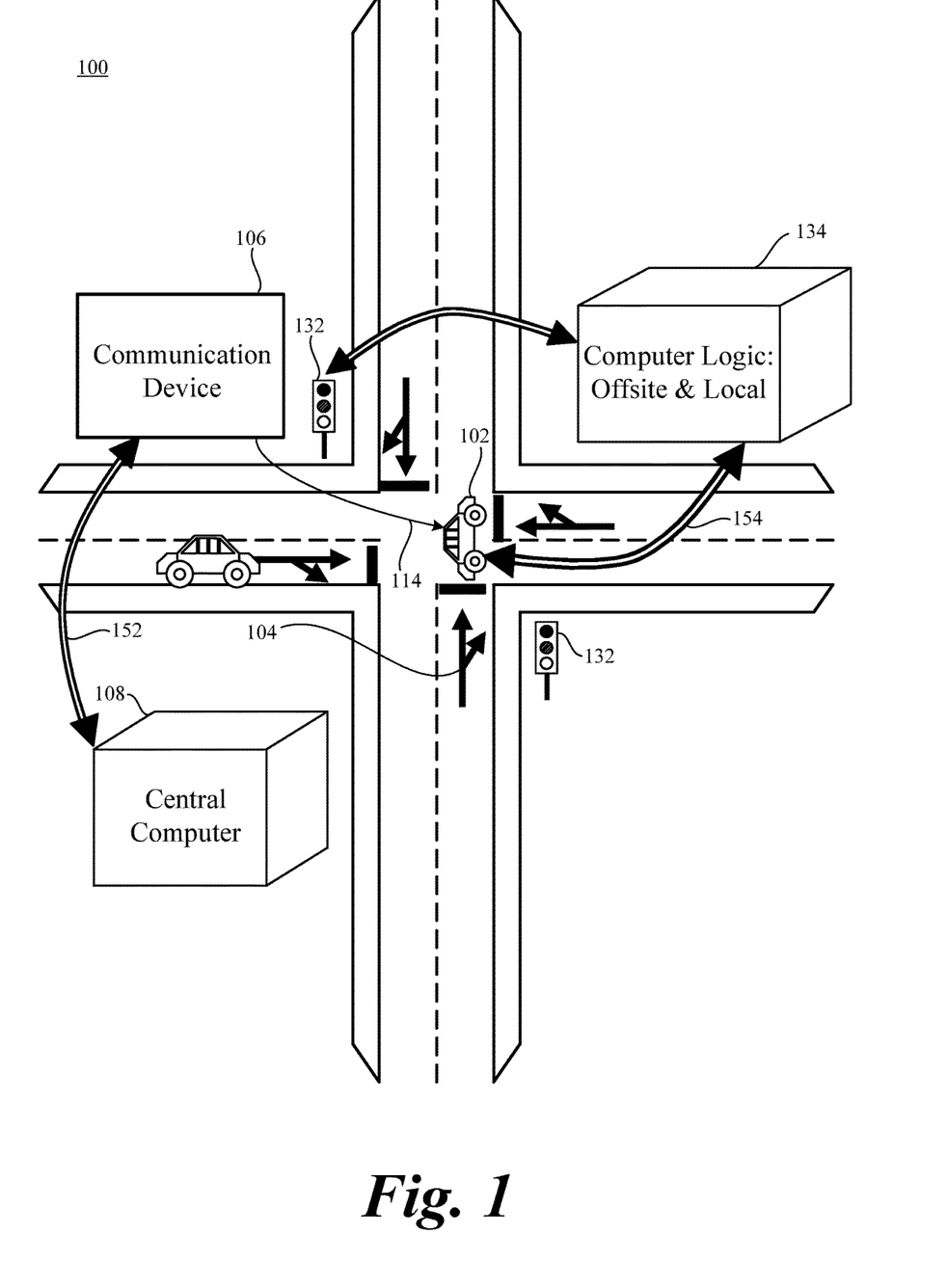
FIG. 1 is a system diagram illustrating a minimal implementation at a traffic light in accordance with a preferred embodiment of the present invention.
Figure 2:
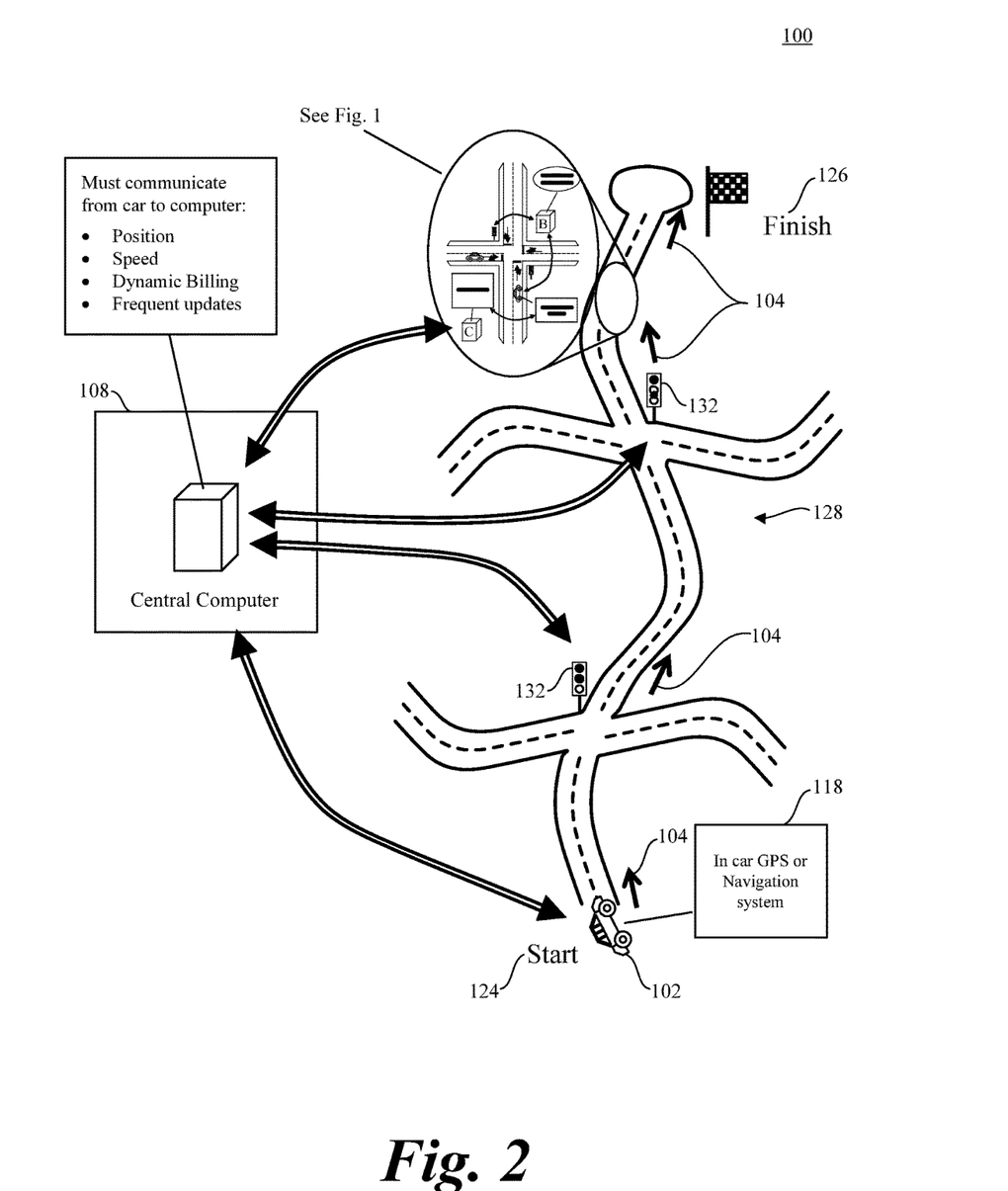
FIG. 2 is a system diagram illustrating implementation for an entire journey in accordance with an embodiment of the present invention.
Figure 3:
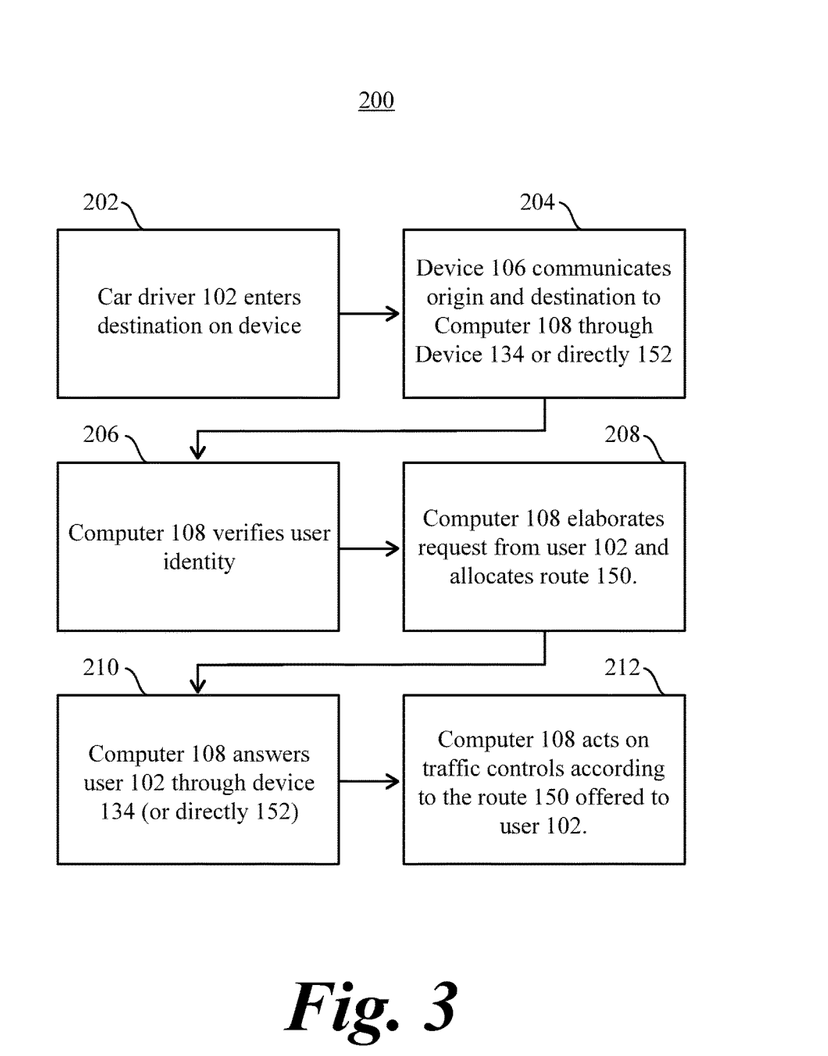
FIG. 3 is a flowchart illustrating functional steps of the systems depicted in FIGS. 1 and 2.
Figure 4:
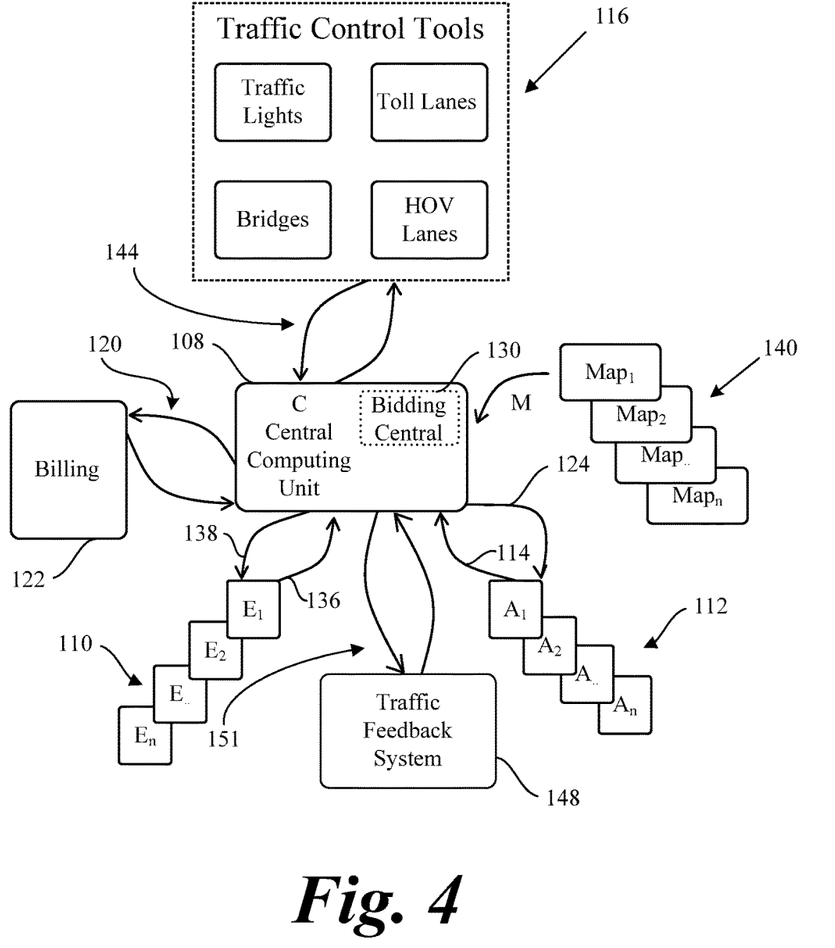
FIG. 4 is a flow chart illustrating certain functional aspects of a Central Computing Unit C in accordance with an embodiment of the present invention.

According to a preferred embodiment of the present invention, and with reference to FIGS. 1-7, in a system and method for traffic decongestion 100, a user 102 identifies a journey 104 that (s)he wishes to take and the conditions/constraints under which (s)he is to undertake the journey, if any (see, for example FIG. 4). By way of example, the user 102 is willing to pay up to $X for the fastest route, or is willing to be paid $Y to go by a less congested route. The user uses a communication device 106, such as, but not limited to: a computer, mobile phone, tablet computer, a dedicated computer, a smart watch or other wearable computer, and/or kiosk, to communicate his desires to a Central Computing Unit 108 (FIG. 2). Other users ($A_1$-$A_n$) may also communicate their interests and constraints 114, if any, to the Central Computing Unit 108. The Central Computing Unit 108 is typically programmed with conditions/constraints that the municipality(ies) or owner(s) of the routes have imposed (see, in general, FIG. 4). These could be, for example, that emergency users ($E_1$-$E_n$) police vehicles have absolute right of way and don't have to pay, or that ambulances and fire trucks are to be given all green lights, etc. Subject to the constraints of the various users and municipalities/owners, the computer 108 preferably calculates, for example, prices to collect from, or payments to be made to, the various users 112, and also notifies and/or controls any sensors/traffic lights/railroad crossings/other signals/barge operators/ferry operators/bridge operators/train operators/ etc. (traffic control tools) 116 along the way about what their actions are to be when any specific user is in transit.

The user 102 takes the journey and various transponders and sensors in the car and roadway track the user's travel. This information is then communicated back 114 to the computer 108, which then verifies the journey and debits or credits the user's account 120 via billing server 122. Along the way, the computer may also offer 124 to reroute the user if (s)he is willing to pay more for a faster route, or pay less (or even receive a payment) for a slower route. Similarly, the computer could offer 124 the user a payment to pull off the road at a specified spot for a specified time (to reduce congestion).

Figure 5:
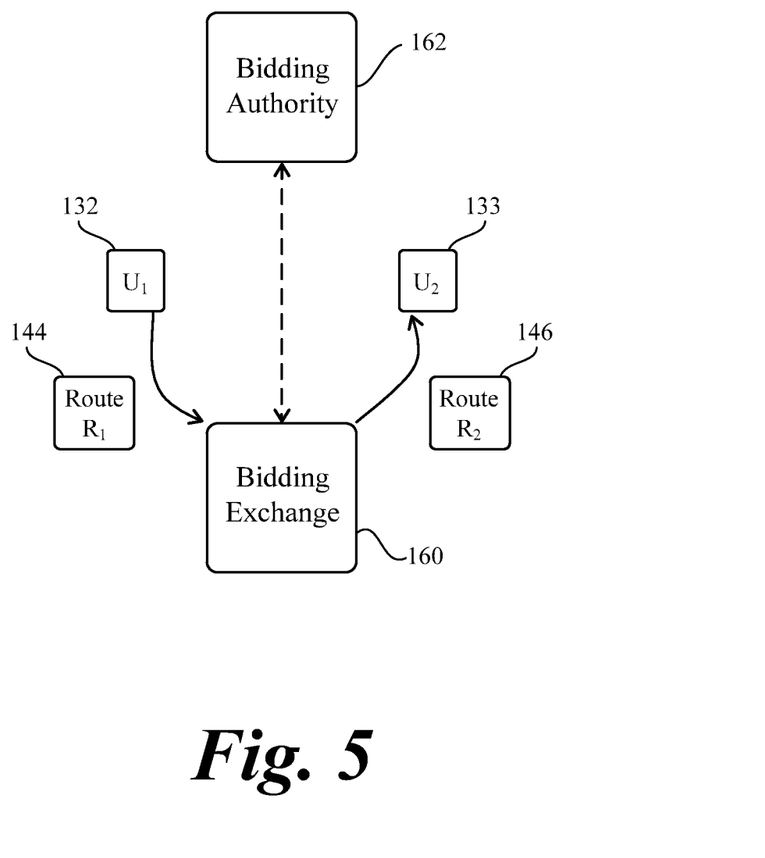
FIG. 5 is a flow diagram depicting one way in which a user may exchange a route with another user in according to an embodiment of the present invention.
Figure 6:
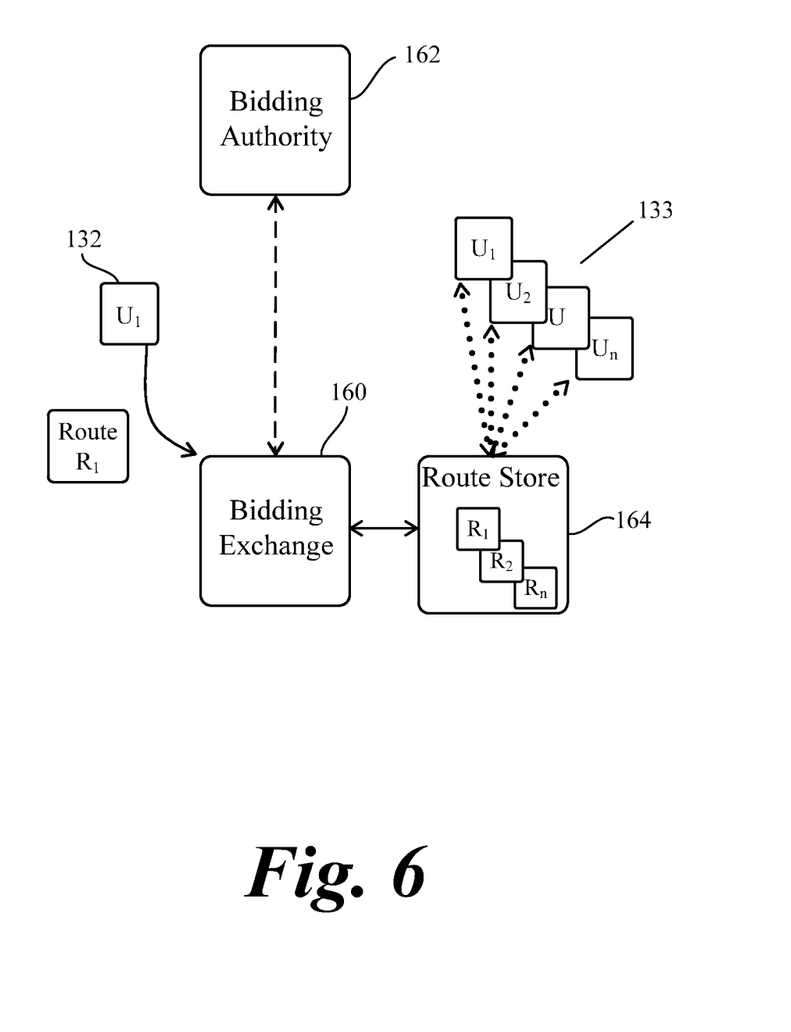
FIG. 6 is a flow diagram depicting one way in which a bidding authority may buy back a route from a seller according to an embodiment of the present invention; and, FIG. 7 is a flow diagram depicting one way in which a bidding authority may buy back a route from a seller according to an embodiment of the present invention.
Figure 7:
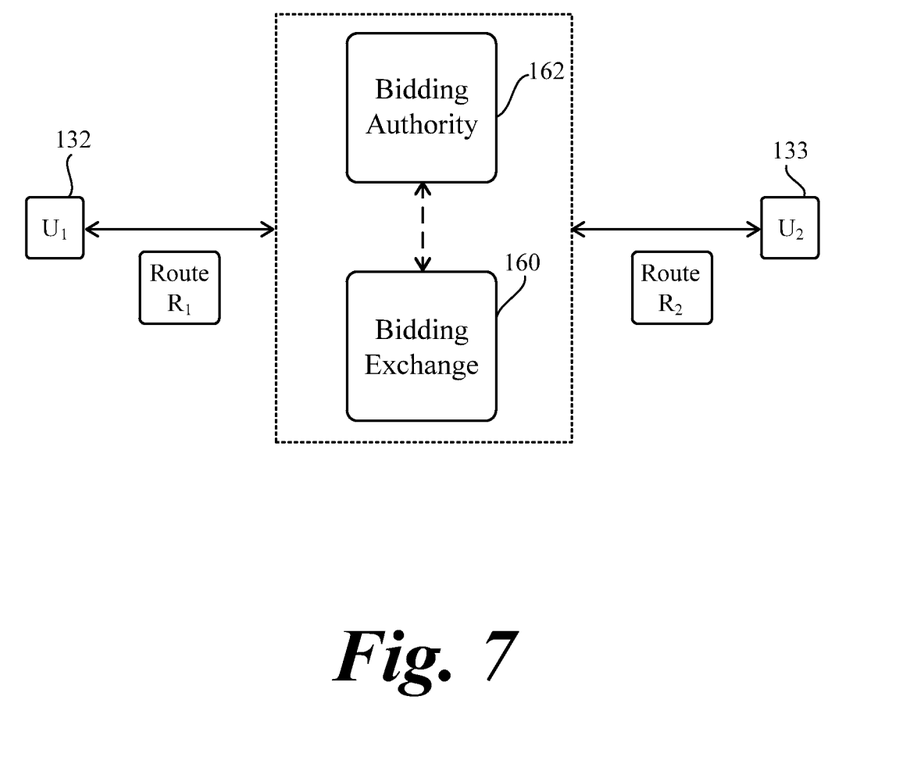

Turning to FIGS. 5-7, the Central Computing Unit 108 may also keep a track of the routes that have been bought by any given user to facilitate trade between users: users would be able to buy and sell their routes, or portions thereof, to each other. The computer may also allow market makers (pejoratively, "speculators", who had no intention of actually using what they bought) to buy and sell routes as well: this would facilitate liquidity, and the creation of a proper two-sided market in travel routes.

In accordance with a preferred embodiment, and with reference to FIG. 2, a user 102 requests a route from Start 124 to Finish 126 across multiple crossroads, intersections, roads, traffic lights, bridges etc. 128 and bids for right to transit that route with the fastest time. The request is processed by the Central Computing Unit 108 that needs to take into consideration other similar or conflicting requests from other vehicles as well as road conditions, known and actual traffic, weather and any other factor influencing said route. The Central Computing Unit allocates a route to user 102 according to the result of the bidding process and acts on Traffic Control Tools 116 represented in FIG. 2 as traffic lights) to allow user 102 to drive his/her route according to the terms of the bidding results.

A detail of a portion of the route described above and illustrated in FIG. 2 is shown in FIG. 1. User 102 has outbid a different user and has priority (right of way) through an intersection controlled by a traffic light.

The Central Computer Unit 108 need not be a single computer—it could be several, and it need not all be under the control of one party. For example, the computer that controlled the notifications need not be the same as the computer that tracked which user(s) owned which routes, as long as those computers were all able to talk to each other. In the stock market, for example, the computers that 'clear' trades are not the same as those that actually 'make' the trades, and are not owned or controlled by the same entity. That said, the Central Computing Unit 108 according to a preferred embodiment may, for example, be one or more computing devices in a central or decentralized configuration.

As illustrated in FIG. 2, a route includes the right to proceed from point A to point B, for example from a starting point (start) to and end point (finish) 126, using a certain collection of roads/highways/bridges/barges/ferries/tolls/ etc. 128, which is valid for a specific period of time. It would be best if such a tight is fungible and could be bought or sold freely but this is not essential.

These 'routes' could be entire journeys (FIG. 2), or could be as little as the right to 'transit' a traffic light in a prioritized fashion (FIG. 1). There is also no necessity to buy 'prioritization' for the entire journey—a user may specify that he wanted 'prioritization' only through certain traffic lights or on certain roads.

FIG. 4 depicts information and activity flow associated with Central Computing Unit 108 in accordance with an embodiment of the present invention. Central Computing Unit 108 communicates with users $A_1$-$A_n$ 112 in order to receive route requests and send allocated routes, represented by arrows 114, 124 respectively. Central Computing Unit 108 communicates with emergency users $E_1$-$E_n$ 110 in order to receive route requests 136 and send 138 allocated routes 150. Central Computing Unit 108 communicates (shown generally at arrows 120) with billing servers 122 in order to identify users 112, verify credit and receive clearance to allocate routes 150. Central Computing Unit 08 also receives map information from map server 140 via arrows 142. Central Computing Unit 108 further communicates with traffic control tools 116 in order to act on traffic control 116 tools to prioritize allocated routes 150 and receive information about status of roads and key points on routes, as depicted by arrows 144.

A Traffic Feedback System 148 (FIG. 4) informs the Central Computing Unit about traffic conditions on each road, intersection, level crossing, ferry, drawbridge, tunnel, bridge, or other means of travel which is part of the system (shown as communication arrows 151). The Traffic Feedback System 148 is operated through a series of sensors, cameras, control systems, and other relevant information gathering devices (for example, but not limited to: weather forecasts, weather balloons, algorithmic inputs, feedback from vehicles, feedback from users, news reports, official vehicles, radar units, etc.) to provide the Central Computing Unit with detailed information about actual traffic, average, minimum and maximum transit speed on each section of the roads and is able to uniquely identify individual vehicles on the roads (via any means necessary, including but not limited to: sensors, transponders, mobile units attached to the vehicle, cameras, radar, eyewitness reports, etc.). The Central Computing Unit receives feedback from the Traffic Feedback System about the actual route taken by each paying user ($A_1 \ldots A_n$) 112 or emergency user ($E_1 \ldots E_n$) 110 to confirm the allocated or purchased route was travelled according to the estimates and the allocation or purchase. Feedback information is used to stop and fine "Freeloaders", bill users, and inform other panics (such as the local authorities, advertisers, security and emergency teams) about actual traffic conditions, prices, future prices, anticipated prices, etc., at all times and as necessary. Data from the Traffic Feedback System 148 is also used to refine algorithms and future route allocations, sales and auctions. In accordance with yet further aspects and embodiments of the present invention, "freeloaders" who use the system without authorization, who travel on routes that they were not entitled to, or use a faster route when they paid for a slower one, or who otherwise abuse the systems would be fined or otherwise sanctioned by the relevant authority.

As illustrated in FIGS. 5-7, users may bid on individual routes $R_1$-$R_n$, or packages of routes, etc. Users $U_1$-$U_n$ may bid manually, or instruct a computing device, such as a bidding computer 130, which may form part of Central Computing Unit 108 to bid for them, subject to whatever constraints they wish. Their bids may be controlled by their own device 106, in which case their device would preferably be in constant or occasional/frequent contact with the bid-receiving computer 130 to receive updates and send back their own updated bids and asks. Or, they could tell the bid-receiving computer 130 what their constraints were and what their request was, and ask the hid-receiving computer 130 to bid (if they were route buyers) or offer (if they were route sellers) on their behalf.

FIG. 5 illustrates one embodiment of the present invention in which an owner (U1) 132 of a route (R1) 144 earn sell it to another person (U2) 133 (in a way similar to the sale of publically traded stock). For purposes of example and ease of understanding, Route 1 144 is sold by User 1 to 132 User 2 133 through bidding exchange 160 in communication with bidding authority 162 and is then designated Route 2 (R2) 146. Upon the sale, at least the owner's name changes. By way of example, imagine that Person A has routes that (s)he wants to sell. (S)he either doesn't need them, or bought them because (s)he thought they would go up in value. (S)he wants to sell them. Person B wants to buy those routes. For this transaction to occur, you need an "exchange" where Person A can offer, and Person B can bid.

FIG. 6 illustrates a further embodiment of the present invention in which the bidding authority 162 can simply buy the route back from a seller. In this example, a user (U1) 132 wants to sell, but there is no one at the present time that wants to buy. The bidding authority 162 steps in, puts its own capital at risk by acting as a market maker (bidding exchange) 160, and acts as a buyer toe user 132, and holds that route in route store 164 for future resale to another user 133.

FIG. 7 illustrates yet a further embodiment of the present invention in which the bidding authority steps in front of every buy and every sell (similar to a futures exchange). If user (U1) 132 wants to sell and user (U2) 133 wants to buy, the bidding authority 162 can simultaneously buy from U1 132 and sell to U2 133 via bidding exchange 160.

By way of further examples, embodiments of the present invention include, but are not limited to any of the following combinations:

Traffic signal 132+road sensors 134+navigation device in car 118+Central Computing Unit 108;

Traffic signal 132+road sensors 134+cell phone or other general purpose mobile computing device for bidding 106+Central Computing Unit 108;

Traffic signal 132+road sensors 134+web application+Central Computing Unit 108;

Traffic signal 132+Central Computing Unit 108+transponder in car 118;

Road sensors 134+Central Computing Unit 108+transponder in car 118;

Traffic signal 132+transponder in car 118+computer in traffic signal located locally 134;

Road sensor 134+transponder in car 118+computer in traffic signal 132; and/or

Road sensor 118+web application+mobile application on mobile device 106 carried in the car.

Cars could be autonomous so an entire journey 104 could be sold to or bought from it.

Self-driven cars could also buy and sell journeys 104 via a website or application, which then also can give them driving directions to follow (so they could stick to the journey 104).

Police and emergency vehicles $E_1$-$E_n$ 110 could receive priority to enable essential services to get to their destination quicker.

Governmental motorcades, funerals, and the like could also purchase priority travel journeys.

In yet further embodiments of the invention, riders (U1-Un) 112, 102 of trains and ferries could bid on and receive priority travel as well.

Pedestrians and bicycle riders (U1-Un) 112, 102 can also bid.

Public transportation and school buses (U1-Un) 112, 102 could also optionally have the right of way.

Bids can be stacked. For example both occupants (U1-Un) 112, 102 in a car could bid. That way they pay more.

HOV (High Occupancy Vehicles) (U1-Un) 112, 102 could also receive payment to encourage more HOVs.

Refunds may be available.

Preferable, purchases can be made while the traveler (U1-Un) 112, 102 is en route.

Journeys 104 driven can be verified via GPS coordinate updates 118 from the vehicle.

The journey 104 is verified as driven by the location reported by the GPS or navigation system 118 in the vehicle (user) (U1-Un) 112, 102.

Tracking could be via GPS and or other wireless location reporting device, transponder, satellite 106, 108, 134.

The journey 104 may be considered property that may be purchased and/or resold.

When a journey is originally sold by the journey selling authority, it is preferably assigned a unique identifier so that this journey could be sold onwards (resold) by the buyer.

In one embodiment of the invention, by way of example, a user purchases a 'fast' journey from Darien, Conn. to New York City for US$10.00 the night before his departure. In the morning, he checks the system before departing, and learns the price for this journey has now risen to $20 (because now many users also want to travel the same journey). This user now has the option to sell his journey for $20 to another user and choose another journey from the authority (if, say, he wanted to go slower, and, in the process, make US$10). Each journey sale has a unique identifier, and it allows that holder of that unique identifier to drive a vehicle on that journey.

In accordance with one embodiment of the invention, by way of example, a user purchases a "fast" journey across a bridge, or a "fast" journey on a ferry (e.g.: the ferry could be faster, or certain vehicles could be stacked to be offloaded first, etc.) or a "fast" journey across an intersection or traffic light ("for example, the light could be changed for all traffic as the buyer's vehicle approaches the intersection to allow him through and/or there could be special lanes routed through the intersection such that the buyer doesn't have to wait) or as "slower" journey across a bridge in exchange for a discount and/or a payment.

Each journey has been turned into property by means of the identifier. A journey means a specific identified owner having the right, over some specified time, to go from Place A 124 to Place B 126.

As best illustrated in FIGS. 5-7, this journey 104 could consist of many sub-journeys which could also be bought or sold. These re-sellings and re-buyings could occur dynamically with or without user input.

Refunds may be provided for journeys not completed due, for example, to an "act of god or agency or other means" or diverted, etc. This preferably would be at the discretion of the selling authority.

In yet another embodiment of the invention, and as illustrated in FIG. 7, the system 100 may include a market for buying and selling journeys 104 to and from users (A1-An, U1-Un) 112, 102 and to and from the central authority 108, 130, all of whom can work in conjunction with insurance companies tracking drivers via a device 106, 118 in the car to give users good driving discounts. The ability to buy and sell journeys is not dependent upon the ability to control traffic lights nor limited to such applications.

In one embodiment, the system can verify the journey 104 a user has driven, while a central authority 108 controls the traffic lights 132. They could just send the user driving directions and verify that the directions are followed. In the alternative the traffic lights 132 can be controlled by the seller (A1-An, U1-Un) 112, 102 of the journey 104.

Users can bid for a destination, and the computer 108, 130 would give the user a price corresponding to an expected time for getting there. Users would be tracked to verify they followed that journey 104. Times could optionally be guaranteed, with refunds/credits/compensation in case the time was not achieved.

Deviations from the journeys could be optionally excused (including, but not limited to, roadwork, accidents, police directions, ambulances, closures, and the like).

In accordance with further embodiments of the present invention, additional features may include, but are not limited to:

Packages can be bundled for commuters—with discounts, for example, on peak/off peak travel bundles.

The system can dynamically update journey options while the user is en route subject to the user's pre-programmed preferences.

Sub journeys could be bought or sold so each part of the journey could have a dynamic price, and users could buy/sell as they travel.

Users could sell their time to the system. By way of example, if there is congestion, the system 100 may ask for volunteers to pull off the road at a designated spot for a specific period of time in exchange for compensation. This could be funded by charging a premium to those that don't want to pull over. The system can take collective bids from people wanting to go faster, and sell those to those that want to go slower.

The system 100 may also select who to offer payments to so as to avoid "free riders". For example, perhaps only those people that have been driving for a set amount of time and for a minimum distance would be offered payments to pull over.

Bidding may be for entire journeys, partial journeys, or even just one or more traffic lights. For example, at a single traffic light, a user would bid (subject to maximum) for the light to turn green. Single users at a local level (FIG. 1) can obtain a right of way at a specific intersection controlled by a traffic light by clicking on an ad-hoc smartphone app, a button on a specific device or similar and accepting a pre-set charge. Communication can happen locally between the traffic light and user, and/or can be at the system level with the Central Computing Unit.

The further back a user is in the queue, the more they would have to bid because everyone in line before them would go first, and would therefore proceed without charge to them. However, the user could be compensated from this bid with, for example, a discounted rate on the bid, or on future journeys, and the like. The traffic authority/municipality may also take part of this revenue.

In accordance with yet another embodiment of the present invention and illustrated in FIG. 3, a method for decongestion traffic is provided. When a user 102 wants to start a new route 150 the user will contact the Central Computing Unit 108 to request a route. Connection is done using communication device 106A (which, for example, may be a smartphone, a car mounted device, etc. as previously described), either directly 152 or through communication 154 via a local device, such as sensors 134. The Central Computing Unit 108 verifies the identity of user and elaborates the route request as well as bidding terms. The computer 108 then allocates the route to user. The Central Computing Unit answers the user contacting Device 106 either directly 152 or through communication 154 via local device 134. Central Computing Unit 108 may act on traffic control tools 116 (FIG. 4) according to the route allocated to user 102.

As further illustrated in FIG. 3, a method 200 for deconstructing traffic to improve a user's travel experience is provided. At step 202, user 102, who may be a car driver or an autonomous vehicle, enters a destination on device 106. At step 204, device 106 communicates the origin and destination information to computer 108 through device(s) 134 or directly 152. At step 206, computer 108 verifies the identity of the user. At step 208, computer 108 elaborates the request from user 102 and allocates route 150. At step 210, computer 108 answers user 102 through device 134 or directly 152. At step 212, computer 108 acts on traffic controls 116 according to the route 150 offered to user 102.

In accordance with yet further aspects and embodiments of the present invention, there would be at least one "reporter" in each vehicle, where the reporter reports information back to the relevant authority such as the position and speed of the vehicle but could and probably will report much more such as current weather conditions, the vehicle's identity information, the owner's identity information, the driver's identity information, the insurers identity information, the vehicle's fault information, credit card and/or account information, which lane it is currently driving in, etc.

In accordance with yet further aspects and embodiments of the present invention, there would be at least one "bidder" for each user and/or vehicle, where the bidder could be permanently attached to the vehicle, embedded in the vehicle's electronics, on a mobile device whether in the vehicle or not, a desktop device whether in the vehicle or not, or any other device or application, whether mobile, desktop, web or other that is capable of submitting bids and responding to offers.

In accordance with yet further aspects and embodiments of the present invention, there would be at least one (if more than one then each communicating with at least one other) bid receiving systems that would receive and act upon bids and offers to buy and sell routes, intersection priorities, requests for priority usage, requests for specific lane usage, requests for free or reduced cost usage, requests for official or emergency usage, etc.

In accordance with yet further aspects and embodiments of the present invention, there would be a sensor network that may be embedded in the roadway, guardrails, overhead lights, or other fixed structure, or overhead on satellites, balloons, drones or other mobile structures. This sensor network will most likely be in addition to the vehicle reporters, but can also be "in lieu" if the sensors are equipped with a means of determining the identity of the vehicle.

In accordance with yet further aspects and embodiments of the present invention, the sensors mentioned above could be "state sensing". The sensors would report back on the state of the object or objects they are monitoring. For example, a traffic light type of intersection control system would report back on the current state of the traffic light: red, yellow or green. A drawbridge would have a sensor reporting back on the state of the drawbridge: open, closed or in motion; a train level crossing would have an indication of whether the gate is open or closed, or closing, or opening.

In accordance with yet further aspects and embodiments of the present invention, the objects being sensed may have control systems: traffic lights, drawbridges, level crossings, even road surfaces (for example, if the road included wireless electric charging through wires embedded under its surface, the charging could be controlled and charged for by the relevant authority) etc., would be controlled by the bidding authority with the sensors reporting back on their current state, and the control system or systems would change their state as desired by the bidding authority.

In accordance with yet further aspects and embodiments of the present invention, additional information systems could send their information to the relevant authority for incorporation into the relevant algorithms as needed. For example, this may include information from radar, lidar, weather balloons, weather forecasts, current temperature, lighting conditions, roadway conditions, automobile condition, etc.

In accordance with yet further aspects and embodiments of the present invention, there could be specialized lanes for different types of vehicles. For example, there could be different lanes for participating vehicles versus non-participating vehicles, and/or autonomous and non-autonomous vehicles. There could also be a variety of lanes of different types such as fixed price lanes, variable priced lanes, lanes with fixed pricing at certain times and variable at other times, lanes with variable pricing that is continuously varying, lanes with variable pricing that is discontinuously varying, etc.

In accordance with yet further aspects and embodiments of the present invention, the relevant authority and/or relevant computers could expose an API for submitting and reacting to bids, an API for dissemination of information, an API for the collection of information, etc.

In accordance with yet further aspects and embodiments of the present invention, there would be at least one authority to collate the bidding and set up the auction(s). The auctions could be continuous (like the stock market during it's normal trading hours) or fixed moment (such as the open and close of a stock market, where all orders are submitted far in advance and simply matched off one versus the other). There could be other types of auctions too such as: sealed bid, second price, minimum bid reserve price, ascending price (English), descending price (Dutch), all-pay, bidding fee, buyout, combinatorial, generalized second price, Japanese, Lloyd's syndicate, Mystery auction, reverse auction, senior auction, silent auction, top-up auction, Walrasian auction, Simultaneous Ascending Auction, Anglo-Dutch Auction, Private Value auction, Common Value auction, etc.

In accordance with yet further aspects and embodiments of the present invention, the various entities that make up the present invention would communicate between and within themselves via any available means: the internet, Wi-Fi, cellular data, Bluetooth, radio, laser, lidar, radar, optical fiber, optical communications, electrical or electronic signals, quantum computing and signaling, etc.

In accordance with yet further aspects and embodiments of the present invention, the bidding authority or other relevant entity would be able to perform any, some, most or all of: Set the prices of routes and conduct sales; Set the prices of intersection priorities and conduct sales; Project future route costs based on the information gathered such as: historical traffic information on those roadways, the current weather, the projected weather, the occurrence of any special traffic events such as sports or holidays (similar to a bookie); Conduct (all types of) auctions of routes/journeys; Conduct (all types of) auctions of intersection priorities; Collect data submitted to it via API or other means; Send out results of bidding and/or sales of routes; Allow bidding on one or more critical pieces of the route such as an intersection; Allow bidding on pieces or whole of a route or routes; Allow and facilitate owners of routes/intersection priorities to resell to other users.

In accordance with yet further aspects and embodiments of the present invention, the bidding authority or other relevant entity would be able to facilitate an orderly market by acting as a market maker when needed by buying from sellers or selling to buyers to maintain an orderly market; facilitate an orderly market by allowing third parties to act as market makers with special privileges and necessary regulations; facilitate an orderly market by allowing and encouraging third parties to act as liquidity providers by enabling third parties to buy and sell routes; and/or facilitate an orderly market by acting as a "central bank" by creating and removing routes from the system in response to supply, demand, public policy, and the like.

In accordance with yet further aspects and embodiments of the present invention, the bidding authority or other relevant entity would be able to allow bids in any currency or credits that the bidding authority chooses; and/or allow automatic bidding, such as, for example, don't exceed a certain amount of money but otherwise get best route as well as create and allow other types of automatic bids desired by user.

In accordance with yet further aspects and embodiments of the present invention, the bidding authority or other relevant entity would be able to give priority to emergency and other official vehicles, if on official business and by request/policy; share revenue with the municipality and or other authorities, owners and stakeholders (for example, people suffering from noise from a new or expanded highway, or even from simply new or existing traffic patterns could be paid something for the noise and congestion and inconvenience); share revenue with those people that are willing to go by a slower route either in cash or in credits; and/or sell monthly/yearly/other discounted passes for bulk trips whether unlimited or a fixed number of trips. The passes could be separable (unused days, trips, periods, etc. could be sold) or non-separable (unused days, trips, periods etc. expire); and/or transferable or nontransferable and all could have different prices.

In accordance with yet further aspects and embodiments of the present invention, the bidding authority or other relevant entity would be able to conduct separate auctions and maintain separate markets for different buyers (commercial, industrial, etc.); conduct separate auctions or maintain separate markets for different types of vehicles (trucks, buses, cars, motorcycles); and/or sell collected traffic data to interested parties. Such data could answer may currently unanswerable questions or conduct activities such as, for example, help you locate your coffee shop; what routes should a delivery company bid for and how much should it bid to facilitate fastest/cheapest/etc. delivery at certain times?; what types of vehicles are the heaviest users at what times?; do criminals bid differently than non-criminals?; conduct games based on the collected information, in which such games could be conducted, with or without prizes; guess the traffic over a given time period in a given region; how many cars entered I-5 in the last hour, and what will the effect be on traffic if we construct a new bridge at location X instead of location Y?

In accordance with yet further aspects and embodiments of the present invention, the bidding authority or other relevant entity would be able to correlate collected data with external data for further value such as, for example, identify which zip codes bid the most; produce insights never yet obtained, such as, for example, where should you locate a hospital for fastest transit times to it?; allow external users to bid to make certain routes cheaper, such as, for example, if a store has a drive through, but the traffic is one street over, that store can bid to make travel on its road cheaper: everyone on that road benefits as does the store; and sell the collected real-world market research data.

In accordance with yet further aspects and embodiments of the present invention the bidding authority would conduct the auction and/or sale. The data from all the sensors, bidders, offerers, cars, balloons, satellites, etc. would be relayed to the bidding authority. This data could be relayed continuously, periodically, at specific times or time intervals, or as otherwise required or needed by the bidding authority. The data could be cached by each device, bidder, market participant, etc., if a connection wasn't available for immediate transmission, or for any other purpose such as keeping a record of activity. The bidding authority would also store incoming data for as long as deemed commercially viable or necessary. The bidding authority would take all this data and use it to auction and/or sell the routes, continuously, periodically, or at specific times, with prices set via auction, algorithm, fiat, policy, or otherwise. A full or partial depth of book could optionally be communicated by the bidding authority should it so choose: such a depth of book would minimally show outstanding bids, offers, and sizes but could show more at the option of the bidding authority.

The results of these auctions, sales, bids and offers, would be communicated back to the bidders, offerers, speculators, market makers and other market participants. In this way a constantly functioning two-way market would be created with buyers and sellers for all routes/intersection priorities, with prices set by whichever mechanism produces the result desired by the municipal authorities/owners of the rights of way along the routes. The resulting revenue could be shared with affected parties and/or anyone else that the municipal authorities/owners of the rights of way deem fit, just and necessary at whatever rate or rate(s) or sharing mechanism they see fit to institute.

The bidding authority could also adjust its processes to maximize whatever social value or combination of values it saw fit. Some examples of these would be maximization of revenue (a la airline revenue maximization algorithms), minimization of inconvenience to travelers, minimization of time to travelers, minimization of noise, reduction of congestion at certain places at certain times, speed of access to certain critical buildings (e.g., hospitals) or locations (e.g., fires, mudslides, natural disasters, etc.), or any other function that the bidding authority saw fit or was asked to implement by the relevant authorities. If the bidding authority was asked to simultaneously meet many different objectives (e.g., some combination of those listed above), then it would have to engage in tradeoffs: all the data collected would allow it to make those tradeoffs in the most practical and efficient possible manner, and if the resulting tradeoff were not politically acceptable or expedient, it would be able to demonstrate different tradeoffs and their likely costs to allow its political masters to pick a politically expedient solution that was possibly still economically viable.

In accordance with yet further aspects and embodiments of the present invention the system would control more than just traffic lights, it would implement "intersection control systems" of which one embodiment would be a traffic light. Other embodiments could include autonomous vehicles with sensors, where the autonomous vehicles would each report their positions to other autonomous vehicles in their vicinity and/or the relevant central authority, and each vehicles would negotiate its priority to cross the intersection with the central authority and/or the other vehicles approaching the intersection.

In accordance with yet further aspects and embodiments of the present invention the congestion control would occur via bidding on routes: the relevant authority would be buying something akin to an airline ticket: the right to use some set of roadways/bridges/ferries/tunnels/etc. for a limited time and over a certain route or routes.

In accordance with yet further aspects and embodiments of the present invention only a part of the route may have the system implemented and/or only part of the route may be charged for, monitored and controlled by the relevant authority. The entire route doesn't have to be. For example, the present invention could be implemented only on certain major roads and highways. Exemptions could be made available to residents/businesses, etc., as needed.

In accordance with yet further aspects and embodiments of the present invention the system will expose an API for navigation and other routing systems to hook into so that other software and hardware providers can hook into the present invention as needed: for example a navigation application could also bid on behalf of its user.

In accordance with yet further aspects and embodiments of the present invention the system integrates all types of sensors: ground-based, satellite-based, roadway based, guardrail based, traffic lights etc., as well as any other relevant data from any source. The sensors relay current congestion and other driving conditions (weather, for example) to the car, routing app, Central Computing Unit etc., for the purpose of calculating prices for the routes/priorities/lanes/etc., or auctioning the routes/priorities/lanes/etc. or any other related or useful purpose.

In accordance with yet further aspects and embodiments of the present invention the system the bidding authority can share aggregated real-time and historical information with its users as well as show possible future traffic or other patterns or data to bid on so that users are able to bid intelligently for their routes.

In accordance with yet further aspects and embodiments of the present invention the system the bidding authority can conduct sales or auction in real time or in advance, optionally with a discount/premium for buying in advance. Routes could also be sold "blind" at a discount for speculators (this would jumpstart liquidity) similar to the heavily discounted airline fares that allow you to fly somewhere really cheap, as long as you don't much care where that somewhere is.

In accordance with yet further aspects and embodiments of the present invention the system the bidding authority can make available aggregated traffic to bidders that are not drivers, e.g., advertisers for location based ads such as drive-thru vendors, gas stations or additional services or shops where drivers may decide to stop. Such advertisers may be allowed to bid in order to reroute part of the traffic through the proximities of their establishments.

Additionally, the anticipated or current or future revenue could be securitized and sold. Securitized revenue itself could be used for all sorts of purposes including acquiring rights of way, eminent domain, etc. Anticipated securitized revenue could be used for construction costs, land acquisition, compensation to current owners, etc. Self-driving cars connect smoothly into the system and benefit automatically from the advantages of the system either by enjoying shorter driving times or by accumulating credits that can be used to the passenger benefit or to offset the driving cars costs. There would be many fewer accidents and thus many fewer deaths. Emergency vehicles could navigate through traffic faster. There would be fewer incidents of road rage. There would a great gain in available time that would be freed up from sitting in traffic.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claim(s) that follow.

The embodiments of the invention in which an exclusive property or privilege is claimed are defined as follows:

1. A system for advanced travel, comprising:
a communication device for providing a bid for a desired ticket for a travel route, wherein the ticket comprises a right to travel on the travel route for a limited time, and wherein the travel route comprises a specified set and sequence of one or more route components selected from the following group of route components: roadways, intersections, traffic lights, bridges, ferries, turnpikes, and tunnels; and wherein the bid comprises a user input, a travel route fee, and at least one of a vehicle information, and automatic bid; and,
a control unit for receiving the bid and rendering a decision based on the bid, wherein the decision is based upon an auction among the bid and competing bids and at least one of: approval for the ticket for the desired travel route, compensation for bidding an alternate ticket to a less congested route, and decongestion of the desired travel route; and wherein the travel route fee paid by the auction's winning bidder is apportioned among the owners/administrators of the route components of the travel route.

2. The system of claim 1, further comprising:
at least one sensor that provides traffic-related intelligence, wherein the control unit includes the traffic-related intelligence in making the decision whether to award the desired travel route.

3. The system of claim 2, wherein the at least one sensor is from the group of ground-based, roadway-based and satellite-based sensors.

4. The system of claim 1, wherein the communication device is from the group of computer, mobile phone, vehicle reporter, tablet computer, a dedicated computer, a smart watch, other wearable computer and kiosk.

5. A method for travel along a desired route, comprising the steps of:
selecting a ticket for a desired travel route and corresponding time;
bidding on the ticket for the desired travel route and corresponding time;
receiving a decision on whether the ticket for the desired travel route and corresponding time was awarded; and
buying a right to the ticket to the desired travel route and corresponding time.

6. The method of claim 5, further comprising the step of offering to resell the ticket to the desired travel route; and wherein the ticket to the desired route and time is selected from the group comprising: an entire journey and a portion of the journey; and
wherein the ticket further comprises the right to prioritized travel relative to other travelers, and wherein the right to prioritize can be applied to the entire journey, or only a portion of the journey.

7. A method for advanced travel, comprising the steps of:
entering a destination on a communication device;
receiving location information and destination information from the communication device;
verifying the location and destination information and vehicle information;
identifying at least a route based on the location and destination information, wherein the at least a route is selected from the group including a fastest route, a congested route, and a less congested route;
placing a bid by the user for one of the at least route, wherein bid value for the fastest route and the congested route is higher than bid value for the less congested route; and
allocating either of the fastest route or the congested route to the user based on the bid, vehicle information, and traffic-related intelligence, or awarding a compensation to the user for bidding the less congested route,
wherein the traffic-related intelligence further comprises enabling superplayers to be deemed to outbid, with or without payment, as desired by the relevant authorities, any other non-superplayer bidder and thereby be granted the fastest driving times to their destination, wherein the superplayers are selected from the group comprising emergency vehicles or law enforcement vehicles in emergency travel.

8. A system for advanced travel, comprising:
a communication device for providing a bid for a desired ticket for a travel route, wherein the ticket comprises a right to travel on the travel route for a limited time, and wherein the travel route comprises a specified set and sequence of one or more route components selected from the following group of route components: roadways, intersections, traffic lights, bridges, ferries, turnpikes, and tunnels;
wherein the bid comprises a user input, a travel route fee, and at least one of a vehicle information, and automatic bid; and
a control unit for receiving the bid and rendering a decision based on the bid, wherein the decision is based upon an auction among the bid and competing bids and at least one of:
approval for the ticket for the desired travel route, compensation for bidding an alternate ticket to a less congested route, and decongestion of the desired travel route; and
wherein bidders may bid on individual routes or aggregated packages of routes, and may bid manually, or may instruct a bidding computing device to bid for them, subject to whatever constraints the bidders specify;
wherein bidder's bids may be controlled by their own computing device, and wherein said computing device is configured to be capable of constant or occasional contact with the bid-receiving computer to receive updates and send back their own updated bids and asks; and
wherein the bidders can specify the constraints to the bid-receiving computer, wherein the constraints include one or more of: what their bid conditions were, what their bid request was, and instructing the bid-receiving computer to bid if they were route buyers, or offer if they were route sellers, on their behalf.

* * * * *